Patented May 29, 1945

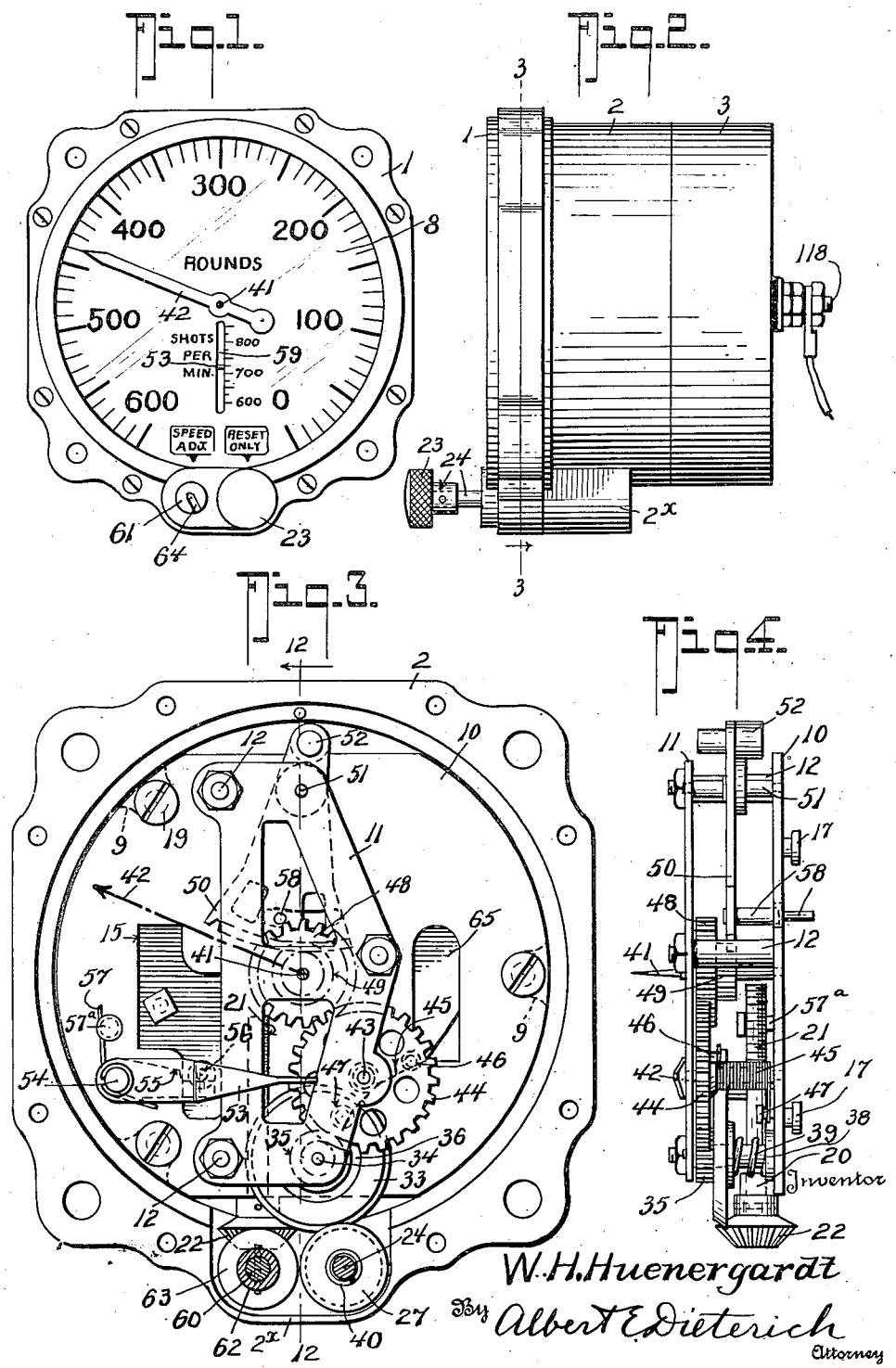

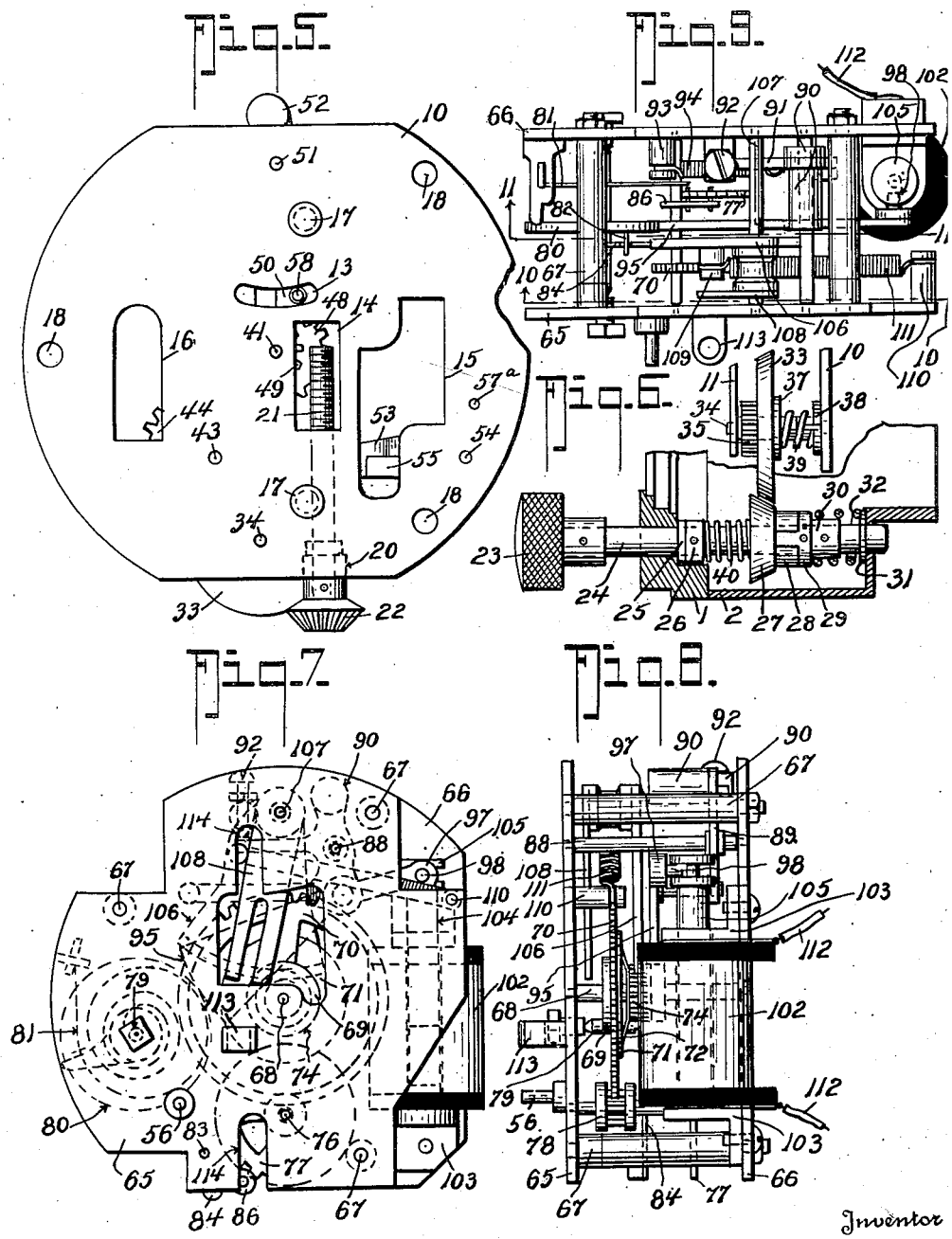

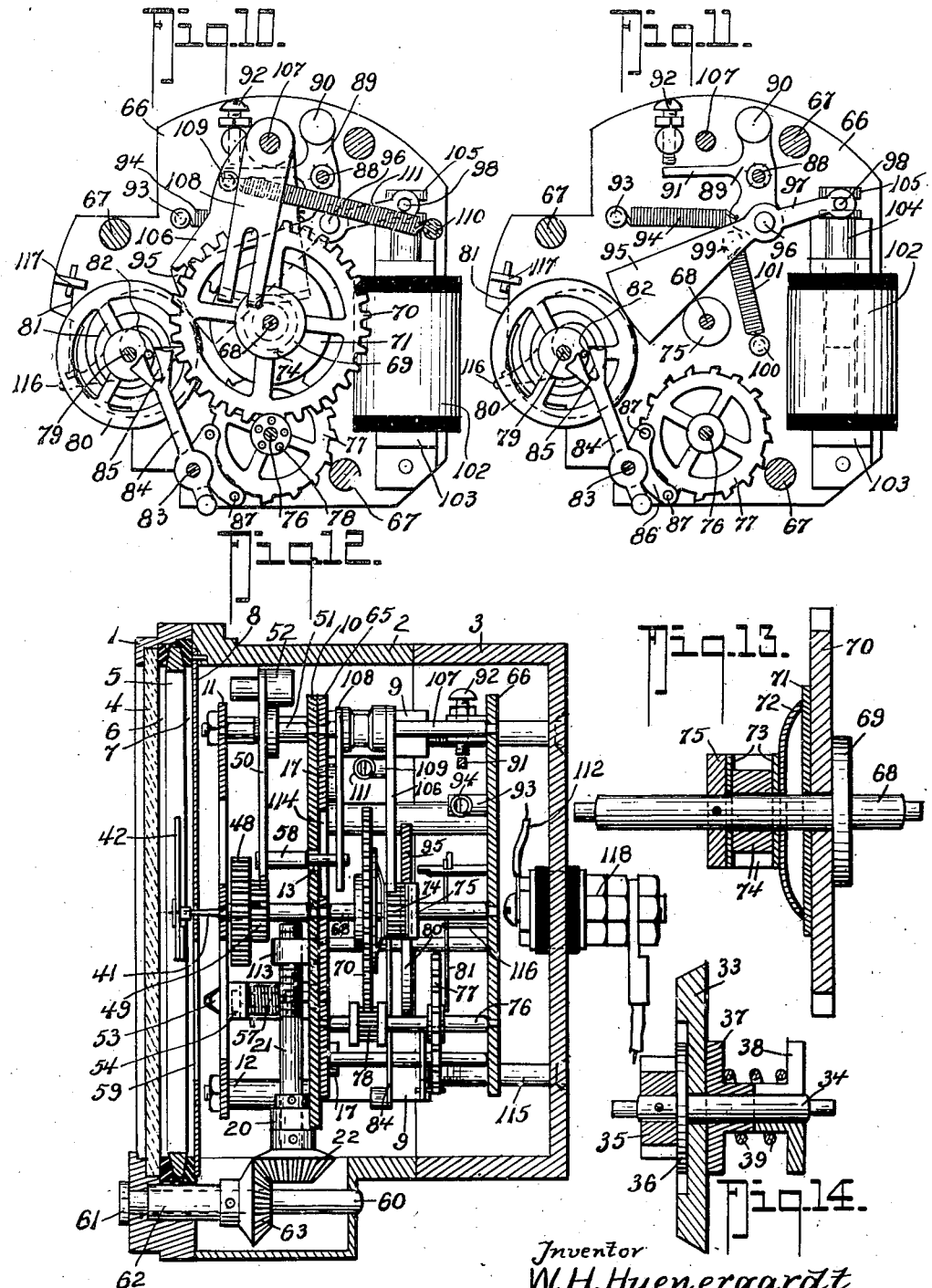

2,377,011

UNITED STATES PATENT OFFICE 2,377,011

AMMUNITION ROUNDS INDICATOR

William H. Huenergardt, Chicago, Ill.

Application July 27, 1942, Serial No. 452,563

18 Claims. (Cl. 161—15)

My invention relates to a certain new and useful instrument for use, principally, in connection with electrically controlled machine guns, although I wish it understood that its use is not limited thereto; the invention may be employed wherever instruments of this character may be found useful.

Generically, the invention has for its objects: to provide means by which the gunner may determine at a glance the number of rounds fired by and/or left in the gun; to provide an indicator which may be mounted at a distance from the gun, as, for example, on the instrument board of an airplane in order to avoid as much shock to the instrument as possible; to provide an instrument which can withstand the shocks and jars incident to its use without being thrown out of adjustment or rendered inoperative; to provide an instrument which can be readily set to operate at the desired speed (shots per minute) without disassembling the instrument or adding to or replacing parts thereof; and to provide protective means against jamming of the works, especially in resetting (winding up) and adjusting the speed of the instrument.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which—

Fig. 1 is a face view of the instrument comprising the preferred embodiment of the invention.

Fig. 2 is a side elevation of the same.

Fig. 3 is an enlarged section on the line 3—3 of Fig. 2, the dial plate being removed.

Fig. 4 is a side elevation of what I shall hereinafter term the base unit.

Fig. 5 is a rear elevation of the base unit.

Fig. 6 is a detail view hereinafter referred to.

Fig. 7 is a front elevation of the clockworks unit.

Fig. 8 is a side elevation of the same.

Fig. 9 is a top plan view of the same.

Fig. 10 is a vertical section on the line 10—10 of Fig. 9.

Fig. 11 is a vertical section on the line 11—11 of Fig. 9.

Fig. 12 is a vertical cross section on the line 12—12 of Fig. 3, with the front section of the case and the parts it contains, the dial plate and the pointer in place.

Fig. 13 is a detail view of the friction clutch device for the clockworks unit.

Fig. 14 is a detail view of the reset safety clutch device for the base unit.

Referring now to the accompanying drawings, in which like numerals of reference indicate like parts in all the figures, 1 indicates the front section of the case, 2 the middle or main section which supports the base and clockworks units, and 3 the back section.

The front cover section 1 of the case has a sight opening and is provided with recesses for the glass plate 4, the resilient packing rings 6 and 7 and the wedge-shape-in-cross-section packing squeeze ring 5 (see Fig. 12).

The middle section 2 of the case has lugs 9 on which the base unit is mounted, the base unit (Fig. 4) carrying the clockworks unit (Figs. 7 to 11, inclusive), as will later more clearly appear. The middle unit of the case is also recessed to provide a seat for the dial plate 8 which is calibrated as shown in Fig. 1 and has a vertical slot 59 through which the speed indicating pointer 53 is visible.

The rear (cover) section 3 of the case is secured to the middle section by screws 115 tapped into the lugs 9 (Fig. 12).

The base unit

The base unit comprises a back plate 10, a front plate (skeleton) 11, held together in spaced relation by posts 12.

The plate 10 has an arcuate slot 13, a vertical slot 14, and cut-away portions 15 and 16 (Fig. 5) whose utility will later appear.

On the back of plate 10, in vertical alignment and preferably offset to one side of the central vertical transverse plane of the unit are two headed studs 17 which pass through vertical slots 114 in the front plate 65 of the clockworks unit (Fig. 7) and hold the said unit to the base unit for vertical adjustment, as will later be more fully described.

The back plate 10 has holes 18 through which the screws 19 pass to secure the combined units to the lugs 9.

On the front face of the plate 10 at the bottom thereof is a non-threaded bored lug 20 in which a screw shaft 21 is journalled. This screw shaft 21 is rotatable in lug 20 and has a pinion 22 to mesh with a pinion 63 on speed adjusting shaft 60 (Figs. 2 and 12). The shaft 60 is journalled in and is carried by the front section 1 of the case, and has a head 61 and spacing sleeve 62, as shown. It is also journalled in a bearing in a recessed extension of the middle section 2 of the case as shown in Fig. 12. The head 61 has a slot 64 for receiving a key or screw driver for turning the shaft.

24 indicates what I term the "resetting shaft" (shown in detail in Fig. 6). The shaft 24 has a milled head 23 and is rotatably mounted and is axially movable in a bearing in the front section 1 of the case. On the shaft 24 is a washer 25, a fixed collar 26, a relatively light compression spring 40, a slidable bevel pinion 27 having one member 28 of a positive clutch, the other member 29 of which is on a sleeve 30 pinned to the shaft. A relatively strong releasing spring 32 lies on the shaft between the collar of clutch member 29 and a washer 31 that lies against the case (Fig. 6). The spring 32 pushes shaft 24 outwardly when released so as to disengage friction gear 27 from friction gear 33.

Journalled in the front and back walls 11 and 10 respectively of the base unit is a shaft 34 having a flange 36. To this shaft is secured (by pinning or by being forced on) a pinion 35. As best shown in Fig. 14, the pinion 35 lies to the front side of flange 36. To the rear of that flange there is loosely mounted on the shaft 34 the friction gear 33. Also mounted on the shaft 34 is a flanged collar 37 which is held to bear against the gear 33 by a spring 39. The spring 39 also engages the flange of a split collar 38, held to the shaft with retaining friction. The spring 39 is strong enough to maintain driving connection between shaft flange 36 and gear 33 under all normal conditions, but not strong enough to prevent slipping should abnormal resistance be encountered. The parts shown in Fig. 14 comprise what I shall term the "safety" or "slip" clutch of the base unit.

Journalled in the plates 10 and 11, centrally of the base unit, is the indicator shaft 41 which carries the rounds-indicating pointer 42. Rigidly secured to the shaft 41 are gears 48 and 49, the larger one of which, 48, meshes with a driving gear 44 on a shaft 43 on which is carried the spring 45 of the base unit mechanism. One end of the spring 45 engages stud 46 on the gear 44, while the other end engages a fixed stud 47 on plate 10.

The driving gear 44 also meshes with the pinion 35 on shaft 34.

Carried by a shaft 51 which parallels shaft 41 and is located above and in vertical alignment with shaft 41, is a segment gear 50 that is suitably counterweighted as at 52 and meshes constantly with gear 49. The segment gear 50 carries a finger 58 which passes through slot 13, hereinbefore mentioned, for engagement with the clockworks mechanism, in a manner soon to be explained.

On a stud 54, carried on the front face of the back plate 10, is pivoted a pointer 53. A spring 57 on stud 54 engages pointer 53 and a fixed stud 57a constantly to tend to raise the pointer (rotate it counterclockwise in Fig. 3). The pointer 53 has a portion 55 to be engaged by a pin 56 secured on the front plate 65 of the clockworks unit and projecting through opening 15 in the back plate 10 of the base unit.

Spring 57 constantly maintains contact between pointer portion 55 and pin 56.

The clockworks unit

The clockworks unit is best shown in Figs. 7 to 11, inclusive, by reference to which it will be seen that the front and back plates 65, 66 are secured in spaced relation by posts 67. Mounted in bearings in plates 65, 66, centrally thereof, is the main shaft 68, which, as best shown in Fig. 13, has a flange 69 against which the master gear 70 is pressed by the leaf spring 72, operating through a friction clutch plate 71. A friction ring 75 is secured to shaft 68 and between this ring 75 and the spring 72 are located the washers 73 and the pinion 74 between them. The washers 73, pinion 74, spring 72 and plate 71 are rotatable on the shaft when abnormal resistance is encountered during operation of the instrument. Under all normal conditions the gear 70 turns in unison with the pinion 74.

The parts shown in Fig. 13 constitute the friction clutch for the clockworks unit.

Journalled in bearings in plates 65 and 66, directly below shaft 68, is the escapement wheel shaft 76. This shaft carries the escapement wheel 77 with which the pins 87 for the oscillating lever 84 alternately engage. The rocker 86, that carries the pins 87, and the lever 84 are secured to a shaft 83 that is also journalled in bearings in the plates 65, 66.

The lever 84 is slotted at 85 to receive the impulse pin 82 on the balance wheel 80 carried by shaft 79, to which shaft one end of the balance or hair spring 81 is secured. The other end of the spring passes through the adjusting lever 116 and is anchored at 117.

A pin gear 78 on shaft 76 meshes with master gear 70 (Figs. 10 and 12).

Carried by a shaft 88 journalled in bearings in plates 65, 66, is a brake shoe carrier 89 having an arm 91 to cooperate with an adjusting stop screw 92 (Fig. 11). The brake shoe carrier 89 is constantly urged to turn clockwise in Fig. 11 by means of a spring 94, one end of which is anchored to a stud 93, while the other end is connected to carrier 89.

The carrier 89 has a stud 96 on which a brake shoe 95 is pivoted. The shoe 95 has an arm 97 with a pin 98 to engage with the head 105 of the core 104 of a solenoidal magnet 102 that is mounted on brackets 103 attached to back plate 66 (Figs. 8 to 11, inclusive). A spring 101, anchored at 100 to plate 66 and at 99 to shoe 95, continuously tends to turn shoe 95 on pivot 96 counterclockwise, to maintain contact of the shoe with balance wheel 80 and core 104 raised. Ring 75 serves as a stop for shoe 95. Under normal adjustment, arm 91 lies just clear of screw 92 (Fig. 11). The brake shoe carrier 89 is suitably counterbalanced, as at 90.

Secured on a shaft 107, which is mounted in bearings in the plates 65, 66 and which lies directly above shaft 68 (shafts 76, 68 and 107 lie in the same vertical transverse plane), is a segment gear 106 (Fig. 10) that constantly meshes with pinion 74 and is constantly urged in one direction by a power applying spring 111. This spring drives the clockworks and is anchored at 109 to the gear 106 and at 110 to the plate 66. It will be noted that the anchorage stud 110 is not located in horizontal alignment with pin 109 but is located at a lower level so that the spring will exert as near a uniform pull on segment gear 106 as possible. Also secured to gear 106 on shaft 107 is a forked arm 108 in whose fork the pin 58, hereinbefore referred to, works.

The lead wires 112 of the magnet 102 connect to the respective terminals 118 carried by and insulated from the case section 3, which terminals, in practice, are connected in the firing circuit of the gun whose shots are to be counted.

When the base and the clockworks units have been assembled, the screw 21 is threaded into lug 113 and studs 17 in slots 114 hold plates 10 and 65 in slidable contact.

Operation

When screw 21 is turned (via 61, 63, 22) to bring shafts 68 into axial alignment with shaft 41, shaft 107 will be in axial alignment with shaft 51 so that the leverages of 108 and 50 will be identical and the instrument will be set for the middle speed adjustment for which it has been designed—say for counting rounds fired at the rate of 725 per minute.

If screw 21 is turned to raise the clockworks unit with respect to the base unit, the leverage of arm 108 on pin 58 will be increased and hence the pointer 42 will be moved faster; on the other hand, if the screw 21 is turned to lower the clockworks unit the distance between shaft 107 and pin 58 will be shortened and pointer 42 will be turned more slowly.

The instrument shown in the drawings has been designed for use with guns whose shots per minute may vary between 600 and 850 (see Fig. 1).

Having set the instrument by turning shaft 61 to bring pointer 53 to the proper mark on the dial, the operator presses on knob 23 to bring gear 27 into contact with gear 33 and turns shaft 24 clockwise. This causes pointer 42 to be turned counterclockwise to the desired place on the dial to indicate the number of rounds to be fired.

In resetting indicator hand 42 through knob 23 the balance wheel 80 remains stationary, being held by brake shoe 95 and the adjustment between clock and indicator gear trains is made by slipping pinion 74 in friction clutch (Fig. 13), which yields in either direction when setting the indicator forward or backward. The strength of the friction clutch is such that slippage is permitted during resetting. In other words, the friction clutch (Fig. 13) will yield before the safety clutch (Fig. 14), which yields only at extreme limits of hand travel, preventing injury to the mechanism.

Upon closing the firing circuit of the gun, magnet 102 becomes energized, pulling down core 104 and lifting brake shoe 95 out of contact with wheel 80, thus permitting clockworks to run so long as the circuit remains closed.

When core 104 is pulled down, brake shoe 95 is rocked on pivot 96, while carrier 89 is turned on its pivot by spring 94 until arm 91 contacts screw 92. This keeps pin 98 always centrally lined up in the groove of head 105 and also ensures proper contact of brake shoe 95 with wheel 80 immediately upon de-energization of the magnet so as to stop the instrument instantaneously.

Spring 45 is so arranged as to continuously tend to move gear segment 50 and pin 58 in the same direction as spring 111 continuously tends to move gear segment 106. Therefore, no additional load is placed on the clockworks in order to move the base unit elements.

The resetting or winding-up of the clockworks is accomplished through gear segment 50 and its pin 58 pushing arm 108 toward the left (Figs. 7 and 10).

It will be understood from the foregoing that the shaft 68 is driven by spring 111 at a constant speed, and the speed changes of shaft 41 are effected solely by changing the position of the pin 58 in slot of arm 108 or, in other words, by changing the distance between pin 58 and shaft 107.

Attention is called to the fact that the clockworks mechanism and the moving parts of the base mechanism are fully protected against interference by any part or parts which project outside the case, since element 27 is always pushed out of engagement with element 33, by spring 32, and any oil, dust, or grime which might enter the bearings of shaft 24 and tend to retard its rotation will not cause a variable drag on element 33, as would be the case were elements 27 and 33 in constant engagement.

Attention is also called to the fact that there are two types of clock mechanisms: the self-starting type and the conventional type which must be manually started. Either type of clock mechanism can be used in this invention. However, I show the non-starting type, and therefore the brake shoe 95 is provided with a long contact surface concentric with its pivot 96 so that a rolling or starting motion is imparted to the balance wheel which is sufficient to throw it into motion when coil 102 pulls the brake shoe out of non-operating position.

From the foregoing description, taken in connection with the accompanying drawings, it is thought the complete construction, operation and advantages of my instrument will be clear to those skilled in the art. Obviously, modifications in the designing, proportion and arrangement of parts can be made by those skilled in the art without departing from the spirit of the invention and the scope of the appended claims.

What I claim is:

1. In an instrument of the class described: a case; two complete units mounted cooperatively in said case, one of said units constituting a clockworks unit and the other constituting a base unit, said base unit comprising a frame consisting of a back plate, a front plate and a spacing posts connecting said plates in spaced relation, a hand-carrying shaft journalled in bearings between said plates, a driven gear and a pinion on said hand-carrying shaft, a segment gear pivotally carried by said plates and meshing with said pinion, and a spring loaded driving gear meshing with said driven gear; an operative connection between said clockworks unit and said segment gear; and means to control the stopping and starting of said clockworks unit.

2. In an instrument of the class described: a case; two complete units mounted cooperatively in said case, one of said units constituting a clockworks unit and the other constituting a base unit, said base unit comprising a frame consisting of a back plate, a front plate and spacing posts connecting said plates in spaced relation, a hand-carrying shaft journalled in bearings between said plates, a driven gear and a pinion on said hand-carrying shaft, a segment gear pivotally carried by said plates and meshing with said pinion, a spring loaded driving gear meshing with said driven gear; an operative connection between said clockworks unit and said segment gear; means to control the stopping and starting of said clockworks unit; and means for varying said operative connection to adjust the timing of the instrument.

3. In an instrument of the class described: a case; two complete units mounted cooperatively in said case, one of said units constituting a clockworks unit and the other constituting a base unit, said base unit comprising a frame consisting of a back plate, a front plate and spacing posts connecting said plates in spaced relation, a hand-carrying shaft journalled in bearings between said plates, a driven gear and a pinion on said hand-carrying shaft, a segment gear pivotally carried by said plates and meshing with said pinion, and a spring loaded driving gear meshing with said driven gear; an operative connection between said clockworks unit and said segment gear; means to control the stopping and starting of said clockworks unit; and means for varying said operative connection to adjust the timing of the instrument, said last named means comprising means for shifting the connection between said units, by virtue of which the clockworks running at constant speed will operate the base unit at predetermined different speeds.

4. In an instrument of the class described: a case; two complete units mounted cooperatively in said case, one of said units constituting a clockworks unit and the other constituting a base unit, said base unit comprising a frame consisting of a back plate, a front plate and spacing posts connecting said plates in spaced relation, a hand-carrying shaft journalled in bearings between said plates, a driven gear and a pinion on said hand-carrying plate, a segment gear pivotally carried by said plates and meshing with said pinion, and a spring loaded driving gear meshing with said driven gear; an operative connection between said clockworks unit and said segment gear; means to control the stopping and starting of said clockworks unit; and means for varying said operative connection to adjust the timing of the instrument, said last named means comprising means for shifting the connection between said units, by virtue of which the clockworks running at constant speed will operate the base unit at predetermined different speeds; and means carried by the base unit and operatively connected to the clockworks unit for indicating the different speeds to which the instrument may be set.

5. In an instrument of the class described: a case; two complete units mounted cooperatively in said case, one of said units constituting a clockworks unit and the other constituting a base unit; said clockworks unit comprising a frame, a main shaft carried by said frame, a master gear on said main shaft, a slip clutch connection between said master gear and said main shaft, an escapement wheel and shaft carried by said frame and having a pinion on the shaft meshing with said master gear, a balance wheel, an escapement lever operatively connecting said escapement wheel and said balance wheel, a balance spring for said balance wheel, a pinion on said main shaft, a gear segment meshing with said last named pinion and pivotally carried by said frame, a power spring connected to said gear segment, an arm connected to move with said gear segment and having provisions for operative connection to said base unit, a brake device carried by said frame for normally engaging said balance wheel, and electromagnetic means to release said brake device.

6. In an instrument of the class described: a case; two complete units mounted cooperatively in said case, one of said units constituting a clockworks unit and the other constituting a base unit; said clockworks unit comprising a frame, a main shaft carried by said frame, a master gear on said main shaft, an escapement wheel and shaft carried by said frame and having a pinion on the shaft meshing with said master gear, a balance wheel; an escapement lever operatively connecting said escapement wheel and said balance wheel, a balance spring for said balance wheel, a pinion on said main shaft, a gear segment meshing with said last named pinion and pivotally carried by said frame, a power spring connected to said gear segment, an arm connected to move with said gear segment and having provisions for operative connection to said base unit, a brake device carried by said frame for normally engaging said balance wheel, and electromagnetic means to release said brake device.

7. In an instrument of the class described: a case; two complete units mounted cooperatively in said case, one of said units constituting a clockworks unit and the other constituting a base unit; said clockworks unit comprising a frame, a main shaft carried by said frame, a master gear on said main shaft, an escapement wheel and shaft carried by said frame and having a pinion on the shaft meshing with said master gear, a balance wheel, an escapement lever operatively connecting said escapement wheel and said balance wheel, a balance spring for said balance wheel, a pinion on said main shaft, a gear segment meshing with said last named pinion and pivotally carried by said frame, a power spring connected to said gear segment, an arm connected to move with said gear segment and having provisions for operative connection to said base unit, a brake device carried by said frame for normally engaging said balance wheel, and electromagnetic means to release said brake device, said brake device including a brake shoe to engage said balance wheel, and an arm for connection to said electromagnetic means.

8. In an instrument of the class described: a case; two complete units mounted cooperatively in said case, one of said units constituting a clockworks unit and the other constituting a base unit; said clockworks unit comprising a frame, a main shaft carried by said frame, a master gear on said main shaft, an escapement wheel and shaft carried by said frame and having a pinion on the shaft meshing with said master gear, a balance wheel, an escapement lever operatively connecting said escapement wheel and said balance wheel, a balance spring for said balance wheel, a pinion on said main shaft, a gear segment meshing with said last named pinion and pivotally carried by said frame, a power spring connected to said gear segment, an arm connected to move with said gear segment and having provisions for operative connection to said base unit, a brake device carried by said frame for normally engaging said balance wheel, said brake device comprising a pivotally mounted spring loaded brake shoe carrier, a stop for the same, a spring loaded brake shoe pivotally mounted on said carrier to normally engage said balance wheel, and an electromagnet operatively connected to said brake shoe to move it on its pivot out of engagement with the balance wheel at will.

9. In an instrument of the class described wherein is provided a case, a dial and a pivoted hand to cooperate with said dial, a constant-speed clockworks mechanism connected with said hand for driving the hand, and means operable from outside the case for adjusting said connection to operate the hand at different predetermined speeds; means to effect energization of said clockworks mechanism, said last named means including an operative shaft as part of the clockworks mechanism and having a flange, a gear element loose on said shaft, a friction clutch plate and sleeve free on said shaft, and a spring on the shaft to force said friction clutch plate against said gear element and force said gear element in turn against said flange to hold said gear element frictionally clutched to said flange; a reset shaft journalled in said case, a positive clutch element secured to said reset shaft; a gear element on said reset shaft and having a friction clutch element to engage said first mentioned positive clutch element, said last named gear element upon movement of said reset shaft along its axis in one direction being brought into engagement with said first mentioned gear element; a release spring for moving said reset shaft in the opposite direction; and a spring for maintaining said clutch elements engaged.

10. An instrument of the character described, embodying a base mechanism having a suitable indicating means; a clockworks mechanism; an operative connection between said mechanisms, which connection includes a slotted lever as a part of one of said mechanisms and a pin carrying lever as a part of the other of said mechanisms, the pin operating in the slot of the lever; means for adjusting said operative connection so as to vary the speed at which the base mechanism means is driven, said adjusting means including means relatively to shift said pin in said slot; and suitable means to stop and start said clockworks mechanism.

11. An instrument of the character described, embodying a base mechanism having a suitable indicating means; a clockworks mechanism; an operative connection between said mechanisms, which connection includes two levers, one of said levers being a part of the base mechanism and the other lever being a part of the clockworks mechanism, a pin carried by one of said levers and slidably engaging the other of said levers; means for adjusting said operating connection so as to vary the speed at which the base mechanism is driven, said adjusting means including means to shift the pin along the lever which it engages; and suitable means to stop and start the clockworks mechanism.

12. In an instrument of the class described: a case; a clockworks motor in said case; an indicating mechanism in said case, said indicating mechanism including a frame, a hand-carrying shaft journaled in bearings in said frame, a driven gear and a pinion on said hand-carrying shaft, a segment gear pivotally carried by said frame and meshing with said pinion and a driving gear meshing with said driven gear; an operative connection between said clockworks motor and said segment gear; means to control the stopping and starting of said clockworks motor; and means for varying said operative connection to adjust the timing of the instrument.

13. In an instrument of the class described: a case; a clockworks motor in said case; an indicating mechanism in said case, said indicating mechanism including a frame, a hand-carrying shaft journaled in bearings in said frame, a driven gear and a pinion on said hand-carrying shaft, a segment gear pivotally carried by said frame and meshing with said pinion, and a driving gear meshing with said driven gear; an operative connection between said clockworks motor and said segment gear, said operative connection including two levers, one of which is carried by the indicating mechanism and the other of which is carried by the clockworks motor, a pin and slot connection between said levers, and means to shift the position of the pin in the slot, by virtue of which the clockworks motor running at constant speed will operate the indicating mechanism at predetermined different speeds; and means to control the starting and stopping of said clockworks motor.

14. In an instrument of the class described: a case; a dial; an indicating hand cooperative with the dial; a shaft on which said hand is mounted; a constant-speed clockworks mechanism which includes a main shaft, a pinion loose on said main shaft, a pivoted gear segment meshing with said pinion, a power spring operating to move said gear segment, said main shaft having a flange, a gear element loose on said main shaft, a friction clutch plate loose on said main shaft and engaging said gear element, fixed abutments on said main shaft between which said pinion and said gear element lie, a spring on said shaft between said pinion and said clutch plate for forcing the same into operating engagement with said fixed abutments; an operative connection between said pivoted gear segment and said indicator hand for driving the hand around the dial; and means operating to turn said hand backward and simultaneously retention said power spring.

15. In an instrument of the class described wherein is provided a case, a dial, and a pointer-carrying shaft rotatably mounted in the case and having a pointer cooperating with the dial; a clockworks motor having a power spring, a main shaft driven by said power spring, a connection between said last named main shaft and said pointer-carrying shaft for turning said pointer-carrying shaft in one direction, said connection including shiftable speed changing mechanism to vary the speed at which the clockworks motor drives the pointer-carrying shaft, means to start and stop the clockworks motor; and means operative on said pointer-carrying shaft to reverse its direction of rotation to reset the same and to simultaneously re-energize the power spring of the clockworks motor.

16. In an instrument of the class described wherein is provided a case, a dial, and a pointer-carrying shaft rotatably mounted in the case and having a pointer cooperating with the dial; a clockworks motor having a power spring, a main shaft driven by said power spring, a connection between said last named main shaft and said pointer-carrying shaft for turning said pointer-carrying shaft in one direction, said connection including shiftable speed changing mechanism to vary the speed at which the clockworks motor drives the pointer-carrying shaft, means to start and stop the clockworks motor, means operative on said pointer-carrying shaft to reverse its direction of rotation to reset the same and to simultaneously re-energize the power spring of the clockworks motor, said last named means including a resetting shaft, a pinion loose on said resetting shaft, a clutch member on said pinion and a cooperating clutch member on said resetting shaft, a spring on the resetting shaft continuously tending to engage said clutch members, another shaft carrying a tight pinion, a loose gear and means to frictionally engage said loose gear with said tight pinion, said loose gear and said loose pinion being adapted for engagement, means continuously tending to move said resetting shaft to disengage said loose pinion from said loose gear, said resetting shaft being movable along its axis to engage said loose pinion with said loose gear, and a gear connection between said tight pinion and said pointer-carrying shaft.

17. In an instrument of the class described wherein a clockworks motor cooperates with an indicating mechanism: said clockworks motor including a balance wheel; a brake shoe carrier; a spring tending to move said carrier toward said balance wheel; an adjustable stop for said carrier; a brake shoe pivoted to said carrier and having an end to engage the periphery of said balance wheel; a brake shoe tensioning spring; and a solenoid magnet whose core is connected to said brake shoe for effecting release of the brake.

18. In an instrument of the class described wherein a clockworks motor cooperates with an indicating mechanism: said clockworks motor including a balance wheel; a brake shoe carrier; a spring tending to move said carrier toward said balance wheel; an adjustable stop for said carrier; a brake shoe pivoted to said carrier and having an end to engage the periphery of said balance wheel; a brake shoe tensioning spring; and a solenoid magnet whose core is connected to said brake shoe for effecting release of the brake, said brake shoe comprising a lever counterweighted to balance the solenoid core's weight.

WILLIAM H. HUENERGARDT.